US006725746B1

(12) United States Patent
Wright (10) Patent No.: US 6,725,746 B1
(45) Date of Patent: *Apr. 27, 2004

(54) HIGH TORQUE WRENCHING SYSTEM (75) Inventor: Richard B. Wright, Akron, OH (US)

(73) Assignee: Wright Tool Company, Barberton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,313

(22) Filed: Jan. 29, 1999

Related U.S. Application Data (63) Continuation-in-part of application No. 09/059,712, filed on Apr. 13, 1998.

(51) Int. Cl.[7] .............................................. B25B 13/06
(52) U.S. Cl. ....................................... 81/121.1; 81/436
(58) Field of Search ................................ 81/121.1, 436, 81/441, 119, 124.2, 124.3, 460, 461; 411/402–405, 410, 407, 1–5

(56) References Cited

U.S. PATENT DOCUMENTS

| | | | |
|---|---|---|---|
| 996,841 A | | 7/1911 | Dixon |
| 1,798,944 A | * | 3/1931 | Jackman ...................... 81/441 |
| 2,400,205 A | | 5/1946 | Livermont |
| 2,685,812 A | | 8/1954 | Dmitroff |
| 2,813,450 A | * | 11/1957 | Dzus .......................... 81/436 |
| 3,354,757 A | | 11/1967 | Grimm et al. |
| 3,425,314 A | | 2/1969 | Ohlson |
| 3,656,396 A | * | 4/1972 | Gutshall .................... 81/121.1 |
| 3,802,303 A | | 4/1974 | Evans et al. ................. 81/185 |
| 3,834,269 A | | 9/1974 | Ohringer |
| 3,854,372 A | * | 12/1974 | Gutshall |

(List continued on next page.)

FOREIGN PATENT DOCUMENTS

| | | |
|---|---|---|
| DE | 306 294 | 6/1918 |
| DE | 40 22 763 A1 | 1/1991 |
| DE | 19610748 | 1/1997 |
| FR | 2 234 095 | 1/1975 |
| GB | 1204294 | 9/1970 |
| GB | 2060452 | 5/1981 |
| GB | 2140523 | 11/1984 |
| WO | WO8809708 | 12/1988 |
| WO | WO 99/18361 | 4/1999 |
| WO | WO 00/13857 | 3/2000 |

OTHER PUBLICATIONS

Phillips Screw Company, *Aerospace, Innovation in Fastener Technology*, 8 pp., copyright 1992.
Phillips Screw Company, *Specification sheets*, 16 pp., copyright 1992.
John Forbis, "Double–stage fracturable fastener for bondable elements" Navy Technical Disclosure Bulletin, vol. 10, No. 3, Mar. 1985 pp. 45–51.
"Screws have automatic torque control" Machine Design, vol. 54, No. 23, Oct. 1982, p. 112.

*Primary Examiner*—D. S. Meislin
(74) *Attorney, Agent, or Firm*—D. Peter Hochberg; Sean Mellino; Katherine R. Vieyra (57) ABSTRACT

A high torque wrenching system having a wrench with asymmetrical torque transmission capability. The wrench includes a plurality of protuberances and a plurality of recesses around a central axis. The fastener also includes a plurality of protuberances and recesses around the central axis for mating with the wrench. The protuberances and recesses form a saw tooth shape. Each tooth or protuberance is formed by a first wrenching surface for loosening the fastener and a second wrenching surface for tightening the fastener. The wrenching surface carrying the loosening load is at a much smaller angle with respect to a radial vector extending from the wrench's central axis than the wrenching surface carrying the tightening load. The result is that the loosening torque vector will have a much greater moment arm.

2 Claims, 9 Drawing Sheets

U.S. PATENT DOCUMENTS

| | | |
|---|---|---|
| 3,881,377 A | 5/1975 | Evans et al. .................. 81/186 |
| 3,885,480 A * | 5/1975 | Meunchinger ............. 81/121.1 |
| 3,903,764 A | 9/1975 | Andersen |
| 3,908,488 A | 9/1975 | Andersen |
| 4,073,160 A | 2/1978 | Perret |
| 4,084,478 A | 4/1978 | Simmons |
| 4,151,621 A | 5/1979 | Simmons |
| 4,187,892 A | 2/1980 | Simmons |
| 4,352,614 A | 10/1982 | Hirsch |
| 4,742,735 A | 5/1988 | Stencel |
| 4,882,957 A | 11/1989 | Wright et al. |
| 5,012,706 A | 5/1991 | Wright et al. |
| 5,174,704 A | 12/1992 | Kazino et al. |
| 5,228,250 A * | 7/1993 | Kesselman ...................... 411/5 |
| 5,449,260 A * | 9/1995 | Whittle ...................... 81/121.1 |
| 5,481,948 A | 1/1996 | Zerkovittz |
| D372,409 S | 8/1996 | Wright et al. ................... D8/25 |
| 5,542,273 A | 8/1996 | Bednarz |
| 5,551,322 A | 9/1996 | Mikic et al. |
| 5,697,743 A * | 12/1997 | Parker ........................... 411/5 |
| 5,713,705 A * | 2/1998 | Grunbichler .................... 411/5 |
| 5,921,735 A | 7/1999 | Hughes |
| 5,957,645 A | 9/1999 | Stacy |

\* cited by examiner

HIGH TORQUE WRENCHING SYSTEM

This application is a continuation-in-part of Ser. No. 09/059,712 filed Apr. 13, 1998, pending.

BACKGROUND OF THE INVENTION

1. Field of the Invention

The invention relates generally to a wrench and fastener arrangement and more particularly to a wrench and fastener arrangement with driving surfaces that generate a higher torque in the loosening direction than in the tightening direction or higher torque in the tightening direction than in the loosening direction.

2. Description of the Prior Art

Figure 1:
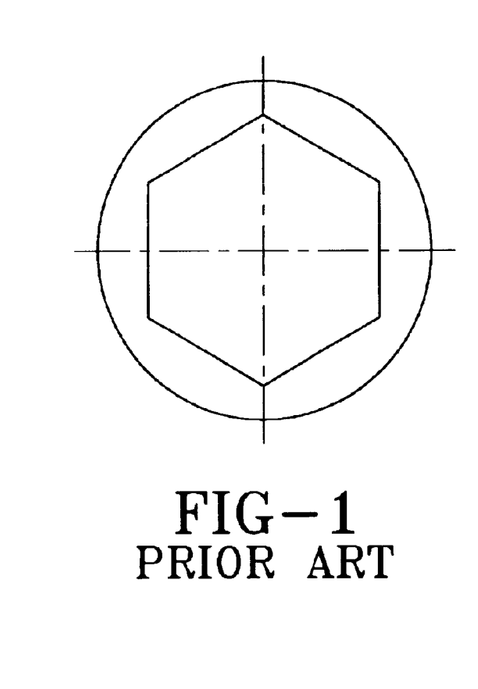
FIG. 1 is a front view of a 1 ½" Hex wrench socket according to the prior art.
Figure 2:
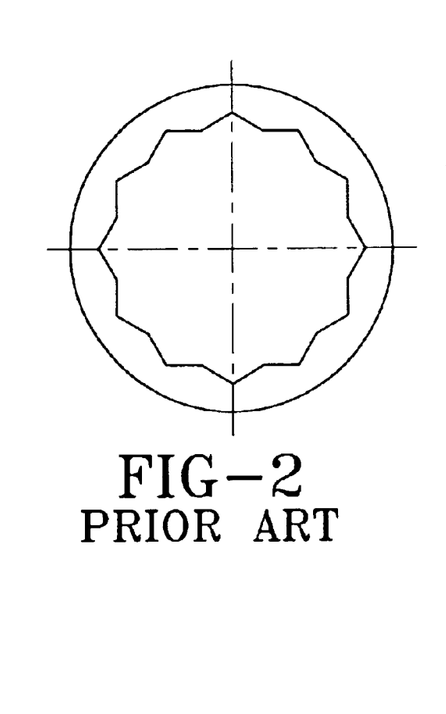
FIG. 2 is a is a front view of a 1"12-point wrench socket according to the prior art.
Figure 3:
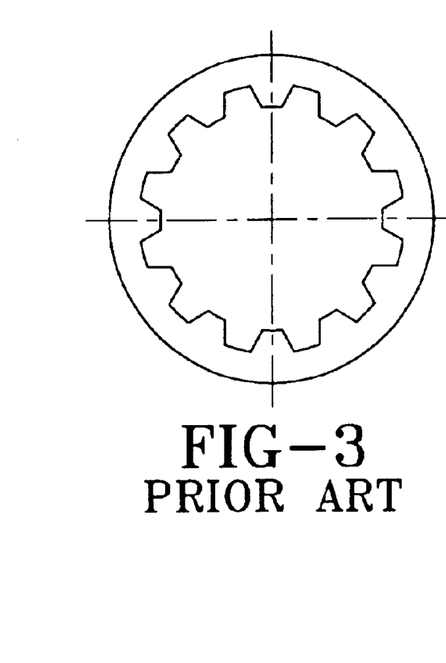
FIG. 3 is a front view of a 1"12-point wrench socket spline according to the prior art.

Wrenches and fasteners have been known in the art for some time. Current wrenches and the mating surfaces of fasteners have been designed symmetrically and have the property of transmitting torque equally in both the tightening and loosening directions. Typical socket wrench types of this kind are shown in FIGS. 1–3. FIG. 1 shows a 1 ½" Hex socket, FIG. 2 shows a 1"12 point socket, and FIG. 3 shows a 1"12 point spline. However, the torque required for loosening a fastener that has been tightened is several times more than the torque required for tightening a fastener. This is because metal surfaces in contact with one another for an extended period of time tend to seize and resist separation. Another factor that causes the fastener to resist separation is the dissolution of the lubricant that may have been present at the time of tightening. Additionally, tightening of a fastener to near its ultimate strength will cause permanent deformation. This permanent deformation causes the pitch of the threads on the fastener to no longer precisely match the pitch of the nut or the tapped hole. The mismatch requires additional torque to force the threaded elements to conform sufficiently to allow rotation of the fastener. Additionally, fastener heads are typically forged. High strength fasteners are typically made from material that is difficult to forge. This material tends not to fill out the outer corners of the fastener, or the inner corners of wrenches.

Other fastening arrangements require using fasteners that will never be removed for security reasons. Systems currently in use include fasteners having two heads where the top head is twisted off during tightening. However, these systems do not have the high torque capability of the present invention.

SUMMARY OF THE INVENTION

In accordance with a preferred embodiment of the present invention, a high torque wrenching system is provided having a wrench with asymmetrical torque transmission capability. The system further provides a fastener that can mate with the asymmetrical wrench so that the fastener can be axially rotated to a loosened or tightened state. The wrench can be a socket type, an open end type, a closed end type wrench or an internal wrench type. The wrench includes a plurality of protuberances and a plurality of recesses around a central axis. The protuberances and recesses form a saw tooth shape. Each tooth or protuberance is formed by a first wrenching surface for loosening a fastener and a second wrenching surface for tightening a fastener. The wrenching surface carrying the loosening load will be at a much smaller angle, with respect to a radial vector extending from the wrench's central axis, than the wrenching surface carrying the tightening load. The result is that the loosening torque vector will have a much greater moment arm. Further, the mating relationship will be less sensitive to dimensional variations of the fastener and wrench, because a better distribution of load can be accomplished on the loosening surface than on the tightening surface, even though the tightening surface is much larger. The load transmission increases proportionally to the number of protuberances or teeth. Therefore, the number of teeth can vary depending on the application or particular torque requirements. Additionally, more teeth will allow the use of a smaller head diameter for a given fastener's size because the difference between the major and minor diameters is less.

The invention also provides a fastener that is easier to forge because the outer connecting surface of the protuberances is smaller in cross-sectional area than the inner connecting surface of the recesses. This tends to squeeze the metal to the corners during forging Additionally, the greater slope on the loosening surface than on the tightening surface tends to move the metal toward the tightening surface, filling the right-hand corner of the outer connecting surface of the fastener and the left-hand corner of the outer connecting surface of the wrench. These are on the portions of the wrench that carry the loosening load, which is the greater load. Therefore, it is desirable to have only a small radius in the corner to make the load carrying surface as large as possible.

An example of a mating fastener type could be a typical hexagonal head with a cross flats dimension of approximately one and a half times the bolt diameter. For the same bolt diameter, a 12-point fastener version with a cross flats of one times the diameter could be provided. Standard 12-point fasteners depending on the details of their construction, including head height and material hardness, may not have sufficient wrenchability to fully utilize the properties of the fastener. Using asymmetrical surfaces increases the torque ability while still preserving the small 12-point heads. Additionally, 15-point variations could increase torque requirements while allowing smaller heads. The wrenching surfaces may be straight or have some curvature or tilt. In particular, it could be beneficial for the tightening surface to have some curvature or tilt to help control and improve the contact pattern despite variations in fastener and wrench dimensions.

The fastener also includes a plurality of protuberances and a plurality of recesses. The protuberances of the wrench mate with the recesses of the fastener, and the protuberances of the fastener mate with the recesses of the wrench. This arrangement is beneficial because it precludes the use of common wrench and fastener types outside this system, which could result in the risk of injury because of failure of lesser strength tool types. The fastener and wrench could be comprised of a special material and hardness, such as a pressed-on ring, to further increase its ability to transmit a higher torque than a standard socket.

According to an aspect of the preferred embodiment of the invention, a wrenching system is provided wherein the wrenching surface carrying the tightening load is at a much smaller angle, with respect to a radial vector extending from the wrench's central axis, than the wrenching surface carrying the loosening load. The result is that the tightening torque vector will have a much greater moment arm. This aspect provides for fasteners that cannot be removed. Preferably, the wrench and fastener tightening surfaces are nearly radial. The loosening surface would be at a greater angle than as previously discussed above for a high torque loosening system because the loosening surface would not be used for transmitting torque, but rather would be provided for backside support and support for the torque transmitting surfaces.

Ridges or other projections may be added to the tightening surface of the fasteners, such that the fasteners would be deformed when sufficient load is applied during the process to prohibit removal of the fastener. For large size fasteners, proper deformation of the fasteners can be verified by inspection. For smaller fasteners, a gage can be made that only fits on the fastener when the projections have been properly deformed.

In yet another aspect of the invention, a two headed fastener is provided having an upper head connected to a lower head by a neck portion. The upper head is a twist off head that breaks away from the fastener when a predetermined torque is reached. The upper head has a diameter that is as small or preferably smaller than the diameter of the lower head. The upper head has a tightening surface that is at a much smaller angle than the loosening surface. The lower head has preferably a nearly rounded surface so that once the fastener is tightened and the upper head twisted off when the appropriate torque is reached, the lower head cannot be loosened and removed.

An object of the present invention is to provide a high torque wrenching system.

Another object of the invention is to provide a wrenching system that transmits more torque when loosening a fastener than when tightening a fastener.

Another object of the present invention is to provide a high torque wrenching system that can be used on heads having larger and smaller diameters.

A further object of the present invention is to provide a wrenching system that transmits higher torque with minimum sized fasteners and wrenches.

Another object of the invention is to provide a high torque wrenching system that cannot mate with members outside the system having lesser strength tools that may result in the risk of injury.

Another object is to provide high strength fasteners that are easier to forge than conventional high strength fasteners.

Another object of the invention is to provide a wrenching system that transmits more torque when tightening a fastener than when loosening a fastener.

Yet another object of the invention is to provide a wrenching system with a fastener that cannot be loosened and removed.

A further object of the invention is to provide a high torque two headed twist off fastener.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, preferred embodiment of which will be described in detail in the specification and illustrated in the accompanying drawings which form a part hereof, and wherein.

DESCRIPTION OF THE PREFERRED EMBODIMENT

Figure 4:
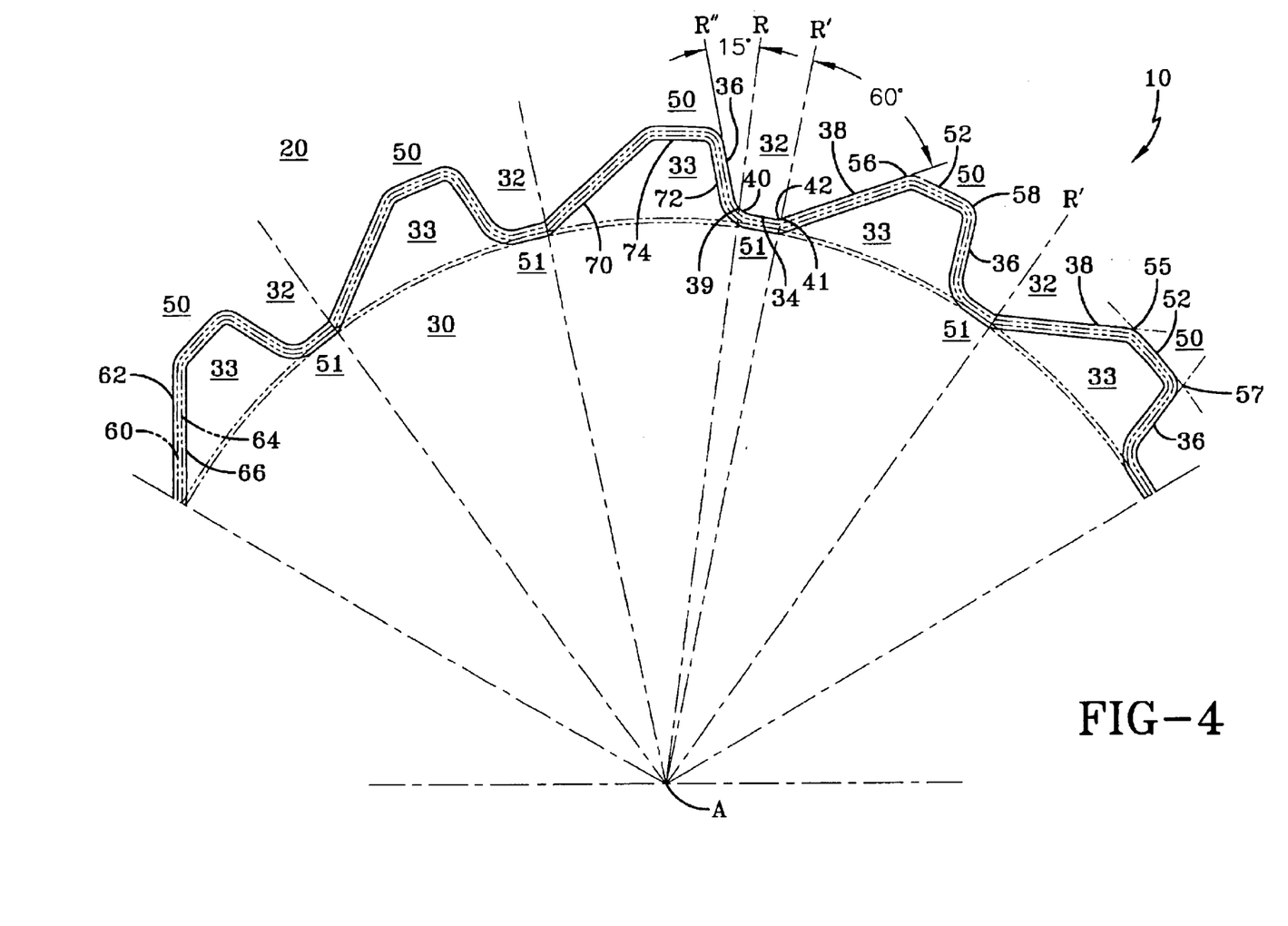
FIG. 4 is an enlarged view of a wrench and fastener represented in outline form.

Referring now to the drawing wherein the showings are for the purpose of illustrating the preferred embodiment of the invention only, and not for purpose of limiting same, FIG. 4 shows the invention in a modification of one of its preferred forms. FIG. 4 shows a high torque system 10 comprised of an asymmetrical wrench 20 and a mating asymmetrical fastener 30 presented in an outline type form which could be an open or closed end wrench type. Standard wrenches and fasteners have a minimum and maximum cross flats dimension established by industry standards. These minimum and maximum dimensions require a maximum and minimum material. Wrench 20 has a maximum material 60 and a minimum required material 62. Fastener 30 has a maximum material 64 and a minimum material 66. The wrench and fastener must be within the minimum and maximum tolerances to be categorized within a specified head size.

Wrench 20 is a 15-point wrench comprised of fifteen uniformly spaced peripherally and fifteen radially disposed protuberances 32 and fifteen uniformly spaced peripherally and radially disposed recesses 50. Each protuberance 32 is located equidistant from a central axis A and each recess 50 is located equidistant from the central axis A. Fastener 30 is a 15-point fastener and is also composed of fifteen uniformly spaced peripherally and fifteen radially disposed protuberances 33 and a plurality of uniformly spaced peripherally and radially disposed recesses 51, having the same shape as the protuberances and recesses of the wrench. Each protuberance of the fastener is located equidistant from the central axis A and each recess of the fastener is located equidistant from the central axis A. The protuberances of the wrench mates with the recess of the fastener and the protuberances of the fastener mates with the recesses of the wrench. The protuberances are slightly smaller than the recesses to make mating possible.

The protuberances are essentially identical for both the wrench and the fastener and only one of the protuberances of the wrench needs to be described in detail, since all of the wrench protuberances are identical. It should be understood that the protuberances of the wrench extend inwardly, while the protuberances of the fastener extend outwardly, so that the surfaces described for the wrench will be diametrically opposed to the surfaces of the fastener. Protuberance 32 has an inner generally circumferential joining surface 34 that connects a loosening wrenching surface 36 and a tightening wrenching surface 38. Loosening wrenching surface 36 and tightening wrenching surface 38 interface with a loosening engagement surface 70 and a tightening engagement surface 72, respectively, on fastener 30. Loosening engagement surface 70 is connected to tightening engagement surface 72 by an outer fastener engagement surface 74. Inner joining surface 34 of wrench 20 extends equidistantly between a given radius from a first point 39 at loosening wrenching surface 36 to a second point 41 at tightening wrenching surface 38. The ends of inner joining surface 34 converge with the wrenching surfaces 36 and 38, and are joined together by a pair of arches 40 and 42. Loosening wrenching surface 36 forms a 15° angle with respect to radius R. Tightening wrenching surface 38 forms a 60° angle with respect to radius R'. The result is that the torque vector of the loosening surface is much larger than the torque vector of the tightening surface, even though the length of the loosening surface is much longer.

The recesses are essentially identical for both the wrench and the fastener and only one of the recesses of the wrench will be described in detail. It should be understood that the recesses 50 of the wrench extend outwardly, while the recesses 51 of the fastener extend inwardly so that the surfaces described for the wrench will be diametrically opposed, with respect to the fastener. Recess 50 has an outer circumferential joining surface 52 that connects tightening wrenching surface 38, which is part of protuberance 32, with a second loosening wrenching surface 36 of an adjoining protuberance. Outer circumferential joining surface 52 extends equidistantly along a given circumference from a first point 55 where its projection intersects a projection of the tightening surface 38, to a second point 57, which is at the intersection of projected second loosening surface surface 36. That is, point 55 is at the intersection of projected surfaces 52 and 38, and point 57 is at the intersection of projected surfaces 52 and 36. Loosening wrenching surface 36 forms a 15° angle with respect to radius R. Tightening wrenching surface 38 forms a 60° angle with respect to radius R' as previously discussed.

As can be seen in FIG. 4, protuberance 32 and adjoining recess 50 form a complete section for mating with a point on a fastener. These sections are repeated radially and equal the number of points of the mating fastener forming a saw tooth type shape. In this embodiment, there are 15 points but the invention could have 8, 12 or a different number of points depending on the application, head size and torque requirements. It should also be understood, that the invention is not limited to a loosening surface having an angle 15° away from radii extending from the central axis of the wrench or fastener, and is not limited to a tightening surface having an angle of 60° away from a radii extending from the central axis of the wrench or fastener. It should be understood that different angles could be chosen according to desired head size, number of points and torque requirements. In all cases the loosening surface would require a smaller angle than the tightening surface. The loosening and tightening surfaces of the wrench and/or fastener may be curved as well as planar.

Figure 5:
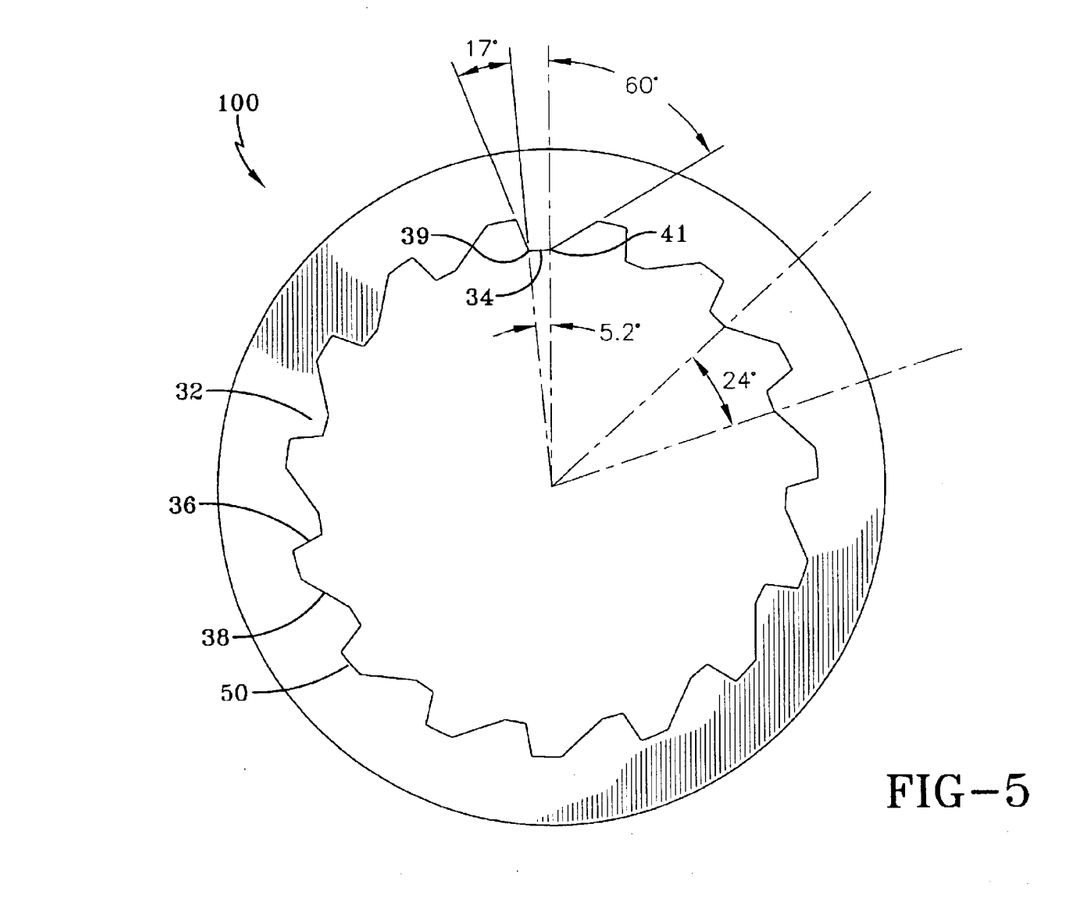
FIG. 5 is a cross-sectional handle-end view of the preferred embodiment as a 15-point wrench socket.
Figure 6:
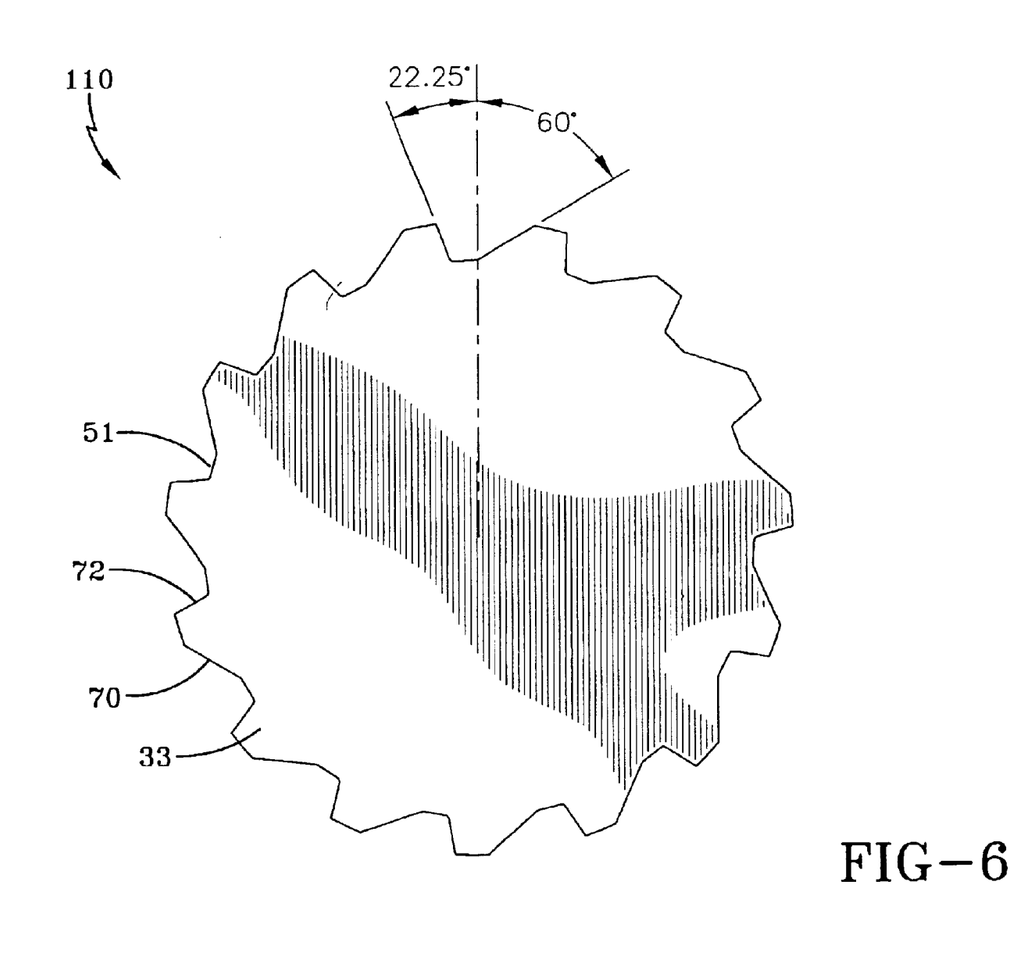
FIG. 6 is a top or socket-end view of the preferred embodiment as a 15-point fastener mate for the wrench socket shown in FIG. 5.

For example, FIG. 5 shows a socket type wrench 100 having 15 points and a mating fastener head 110 shown in FIG. 6. Referring now to socket type wrench 100, where like numerals denote like parts, socket head 100 is comprised of a plurality of protuberances 32 and recesses 50, as described previously, having tightening wrenching surfaces 36 and loosening wrenching surfaces 38. The tightening wrenching surfaces 36 have an angle of 60° away from a radii extending from a central axis, like the previously described embodiment; however the loosening surfaces 38 are at an angle of about 17° with radii extending from the central axis as shown. Each protuberance 32 is spaced apart at 24° angles from each adjoining protuberance. In this particular embodiment, inner joining surface 34 extends circumferentially from points 39 to 41 over an angle of 5.2°.

Referring now to the fastener 110, where like numerals denote like parts, socket fastener 110 is comprised of a plurality of protuberances 33 and recesses 51, as described previously, having tightening engagement surfaces 70 and loosening engagement surfaces 72. The tightening engagement surfaces 70 have an angle of 60° away from a radii extending from a central axis, and loosening surfaces 72 are at a 22.25° angle with a radii extending from the central axis, as described in mating wrench 100.

It should be appreciated that the number of points or teeth of the wrench and number of points on the fasteners can vary depending on the shape, size, hardness of the fastener, and the application being facilitated. Smaller heads can be used as the number of points increase because more teeth will allow for a smaller diameter head. However, smaller teeth require more precise manufacturing. Increasing the number of teeth can increase the amount of torque because the load transmission increases with the number of teeth.

It should also be appreciated that the system described above is a preferred embodiment for increasing torque transmission capability. Although providing a wrench and fastener with a higher torque transmission capability in the loosening direction than in the tightening direction almost inevitably requires an asymmetrical shape, but increasing torque capability may not. A standard design of a 12-point or higher fastener, depending on the details of its construction, including head height and material hardness, may not have sufficient wrenchability to fully utilize the properties of the fastener. However, using a larger cross flats dimension on a 12-point fastener would increase the torque transmission capability and improve the systems overall wrenchability, making it possible to fully utilize the properties of the fastener. For example, if the 12-point fastener is made with a cross flats of 1.3 or 1.5 times the bolt diameter, its wrenchability problems wold be solved and designs originally made with hexagonal headed fasteners could be upgraded and standard wrenches used. The current invention provides a way around this problem while still preserving the smaller fastener heads.

It should also be appreciated that this high torque wrenching system could be applied to internal wrenching systems such as that found in hollow head cap screws such as "Allen" fasteners. This could be possible by interchanging the wrench and the fastener so that the wrench element is inside the hollow head of the fastener. In this configuration, the number of points on the fastener and wrench are likely to be smaller to facilitate manufacturing, because the wrenching surfaces are toward the center of the fastener rather than on the outside, and because there is no need in this design to consider a nut. A nut cannot be made with an internal wrenching configuration, whereas a nut must be considered in the design of an external wrenching configuration, and space must be left for the tapped hole in the nut. In the internal wrenching configuration larger teeth can be used that will not be limited by the internal space.

Figure 7:
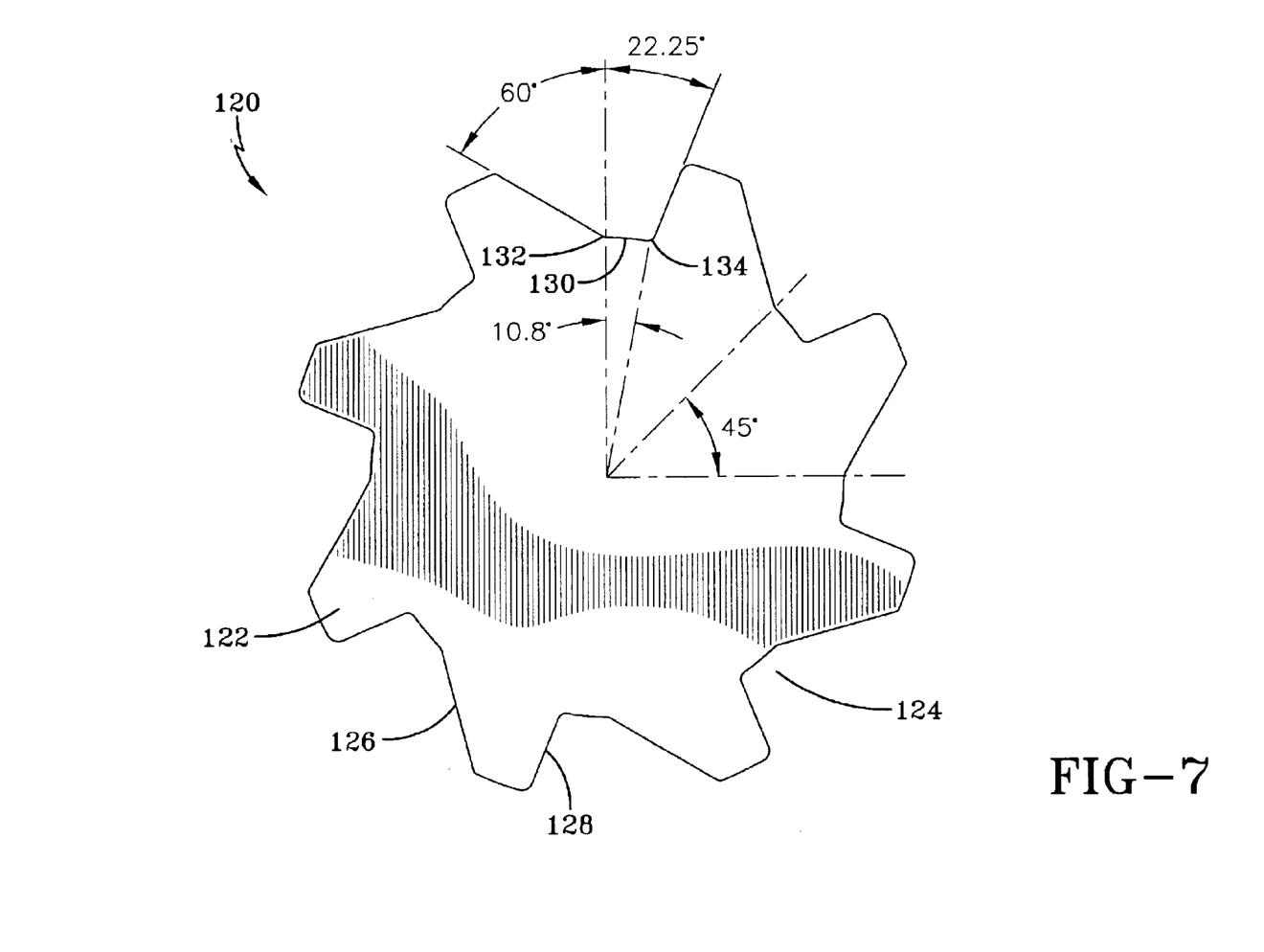
FIG. 7 is a cross-sectional handle-end view of the preferred embodiment as a 8-point internal wrench.
Figure 8:
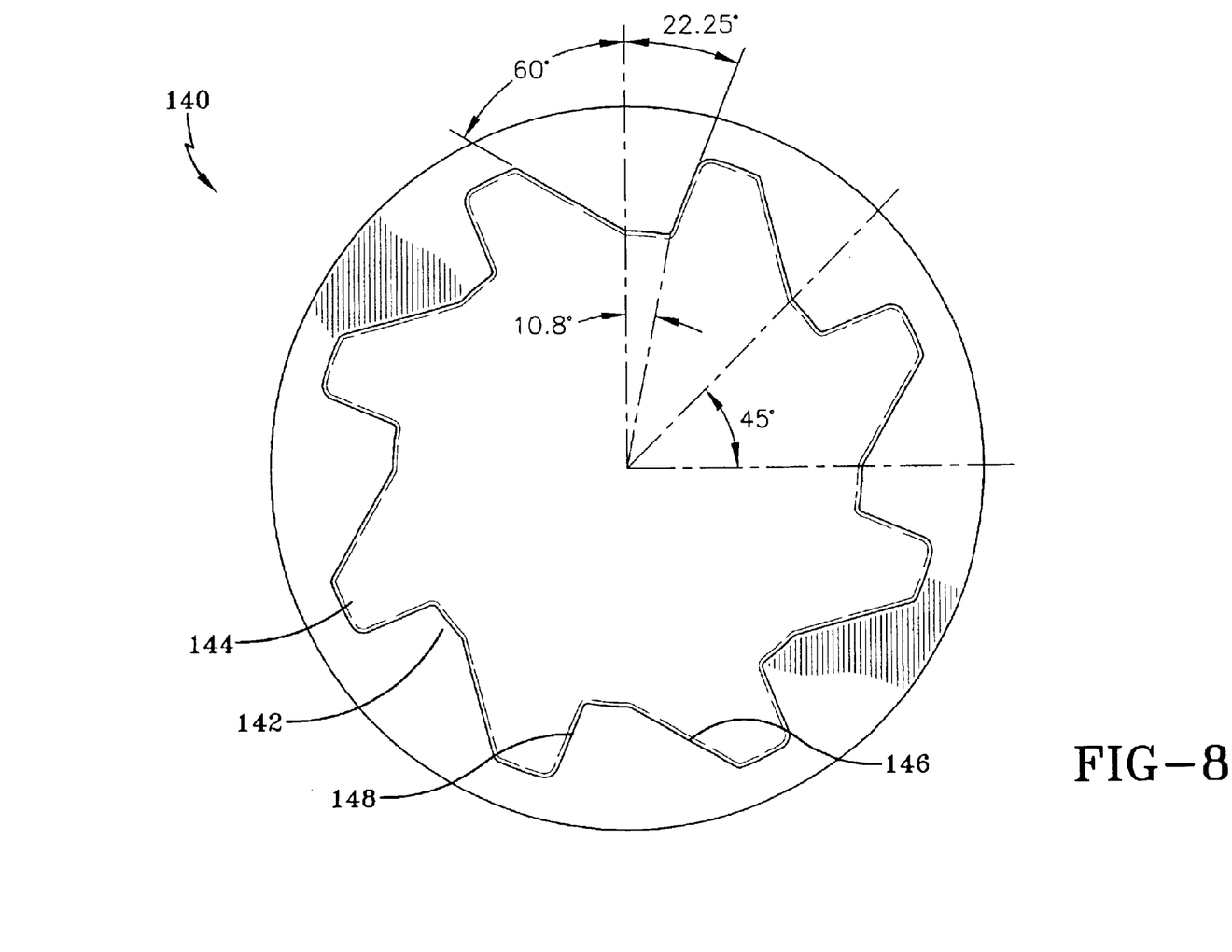
FIG. 8 is a top or handle-end view of the preferred embodiment as a 8-point internal fastener mate for the internal wrench shown in FIG. 7.

Referring to FIG. 7, this figure shows an internal wrench 120 used for mating a hollow head cap screw 140 shown in FIG. 8. Internal wrench 120 and mating hollow head cap screw 140 each have 8 points. Internal wrench 120 is comprised of a plurality of outwardly directed protuberances 122 and inwardly directed recesses 124, each having a tightening wrenching surface 126 and a loosening wrenching surface 128. Tightening wrenching surfaces 126 have an angle of 60° away from a radii extending from a central axis, and the loosening wrenching surfaces 128 are at a 22.25° angle with a radii extending from the central axis, like the previously described embodiment. Each protuberance 122 is spaced apart at 45° angles from each adjoining protuberance. In this particular embodiment, inner joining surface 130 extends circumferentially from points 132 to 134 over an angle of 10.8°.

Referring now to mating hollow head cap 140, shown in FIG. 8, it is comprised of a plurality of inwardly directed protuberances 142 and outwardly directed recesses 144, as described previously, having tightening engagement surfaces 146 and loosening engagement surfaces 148. The tightening engagement surfaces 146 have an angle of 60° away from a radii extending from a central axis, and loosening engagement surfaces 148 are at a 22.25° angle with a radii extending from the central axis, as described in mating wrench 120. General tolerances with respect to the 60° and 22.25° angle would of course apply.

It should be appreciated that the high torque wrenching system is not limited to a system that applies higher torque in the loosening direction than in the tightening direction. In some applications, usually for security purposes, it is desired to use a fastener that will never be removed. For example, in some areas such as prisons, it is desirable to avoid using tools that could be stolen by inmates to assist them in escaping. In these types of applications, it is appropriate to use a high torque wrenching system that applies higher torque in the tightening direction than in the loosening direction.

Figure 9:
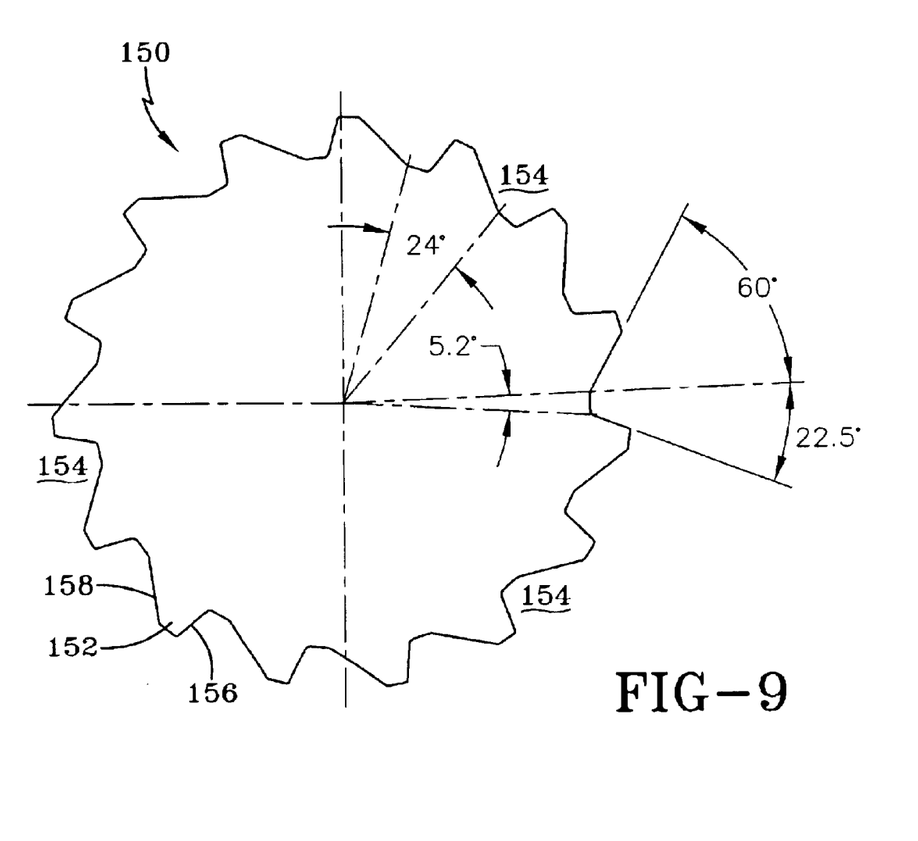
FIG. 9 is a top or socket-end view of the preferred embodiment as a 15-point fastener for a high torque tightening.
Figure 11:
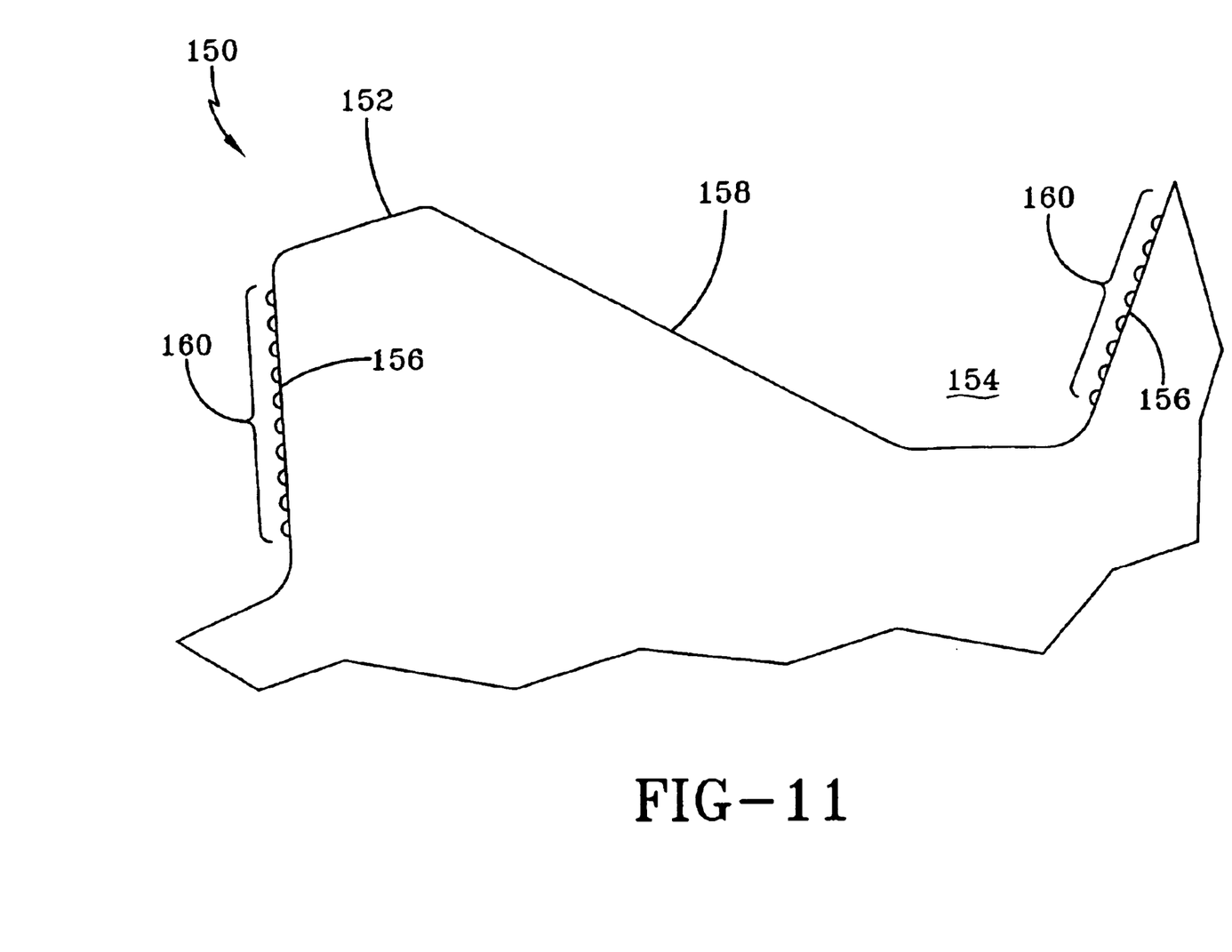
FIG. 11 is an enlarged top or socket-end view of the preferred embodiment of FIG. 9 including ridges on the tightening surface.

Referring now to the FIG. 9, a fastener 150 is comprised of a plurality of protuberances 152 and recesses 154, having tightening engagement surfaces 156 and loosening engagement surfaces 158. The tightening engagement surfaces 156 each have an angle of 22.25° away from radii extending respectively from a central axis, and loosening surfaces 158 are at a 60° angle with radii extending respectively from the central axis. Again general tolerances would apply to the respective angles. For all practical purposes fastener 150 is a mirror image of fastener 110 of FIG. 6. For fasteners that will not be removed, loosening wrenching surfaces 158 are only used for backside support for the torque transmitting surfaces. As can be seen in FIG. 11, a plurality of ridges or projections 160 may be formed on tightening surface 156 of fastener 150. Ridges 160 deform when sufficient load is applied during the tightening process. Determining whether sufficient load has been applied can be done by visual inspection for large fasteners, or by use of a gage (not shown) for small fasteners that would only fit on the fastener if the projections were properly deformed. Such ridges or protrusions could also be formed in the corresponding surfaces of fasteners disclosed earlier where a higher torque is necessary in the loosening direction than in the tightening direction. Thus, each of the tightening surfaces may include a plurality of projections that deform to a predetermined setting upon application of a predetermined torque to the wrench during tightening.

Figure 10:
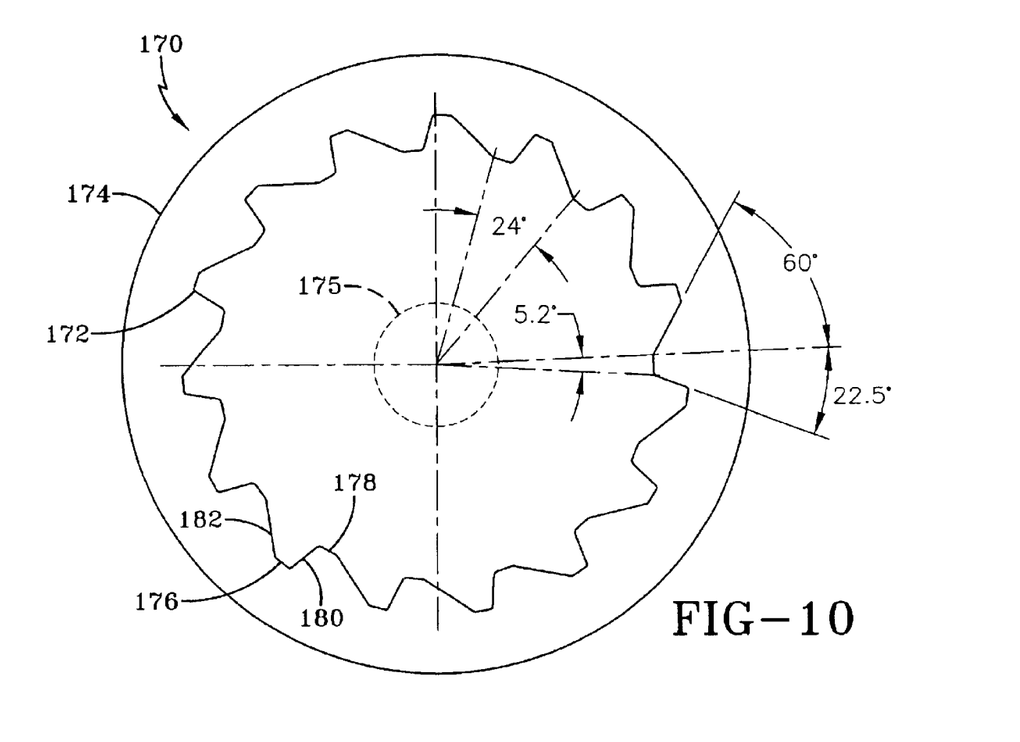
FIG. 10 is a top or socket-end view of the preferred embodiment as a 15-point two headed fastener for high torque tightening.

The current invention is not limited to single headed fasteners. As shown in FIG. 10, a two headed fastener 170 is provided having an upper head 172 and a lower head 174 attached to one another by a neck. 175 (shown by dashed lines). Upper head 172 is a high torque configuration head essentially identical to fastener 150 depicted in FIG. 9. Upper head 172 includes a plurality of protuberances 176 and a plurality of recesses 178, having tightening engagement surfaces 180 and loosening surfaces 182. As before, tightening surfaces 180 are at a much smaller angle than loosening surfaces 182. Lower head 174 has a round circumference such that it can engage with the surface it is tightened on, but cannot be removed. It should be appreciated that if the fastener is desired to be removed, a head can be used similar to the head of fastener 110 of FIG. 6. The lower head could also be shaped in a configuration specifically adapted to a special removal tool. In using fastener 170, a matching wrench is placed over fastener head 172 and turned in the tightening direction. Once lower head 174 engages with the surface that fastener 170 is being fastened to and sufficient torque is applied, upper head 172 and neck 175 are severed from lower head 174. The security of fastener 170 can be further enhanced by enclosing lower head 174. The security of fastener 170 can be further enhanced by enclosing lower head 174 in a countersunk hole.

The foregoing descriptions are specific embodiments of the present invention. It should be appreciated that these embodiments are described for the purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. An asymmetrical high torque wrenching system comprising: a fastener having a central axis comprising, a plurality of fastener tightening surfaces formed in a periphery of the fastener and spaced around said central axis of said fastener, wherein each of said plurality of fastener tightening surfaces forms a fastener tightening angle between a first vector and each fastener tightening surface, said first vector extending radially from said central axis of said fastener through a center point of each fastener tightening surface, and a plurality of fastener loosening surfaces formed in the periphery of the fastener and spaced around said central axis of said fastener, and being equal in number to the number of fastener tightening surfaces, wherein each of said fastener loosening surfaces forms a fastener loosening angle between a second vector and each fastener loosening surface, said second vector extending radially from said central axis of said fastener through a center point of each fastener loosening surface, each one of said fastener loosening surfaces being transverse to one of said fastener tightening surfaces to form at least one fastener protuberance and an equal number of fastener recesses, wherein the fastener tightening angle is smaller than the fastener loosening angle; and a wrench provided for mating with and driving the fastener with a higher torque in a tightening direction than in a loosening direction, said wrench having a central axis and comprising, a plurality of wrench tightening surfaces formed in a periphery of the wrench and spaced around said central axis of said wrench, wherein each of said wrench tightening surfaces forms a wrench tightening angle between a third vector and each wrench tightening surface, said third vector extending radially from said central axis of said wrench through a center point of each wrench tightening surface, and a plurality of wrench loosening surfaces formed in the periphery of the wrench and spaced around said central axis of said wrench and being equal in number to the number of wrench tightening surfaces, wherein each of said wrench loosening surfaces forms a loosening angle between a fourth vector and each wrench loosening surface, said fourth vector extending from said central axis of said wrench through a center point of each wrench loosening surface; each one of said wrench tightening surfaces being transverse to one of said wrench loosening surfaces to form at least one wrench protuberance and being transverse to another one of said wrench tightening surfaces to form at least one wrench recess, the number of wrench protuberances being equal to the number of wrench recesses, wherein the wrench tightening angle is smaller than the wrench loosening angle for each of the wrench loosening surfaces and wrench tightening surfaces;

wherein at least one of the plurality of wrench tightening surfaces formed is configured to mate with at least one of the plurality of fastener tightening surfaces in order to rotate the fastener to a tightened position, and at least one of the plurality of wrench loosening surfaces is configured to mate with at least one of the plurality of fastener loosening surfaces in order to rotate the fastener to a loosened position; and wherein each of said wrench and fastener recesses include a joining surface that connects the respective loosening surface and corresponding transverse tightening surface.

2. An asymmetrical high torque wrenching system comprising: a fastener having a central axis comprising, a plurality of fastener tightening surfaces formed in a periphery of the fastener and spaced around said central axis of said fastener, wherein each of said plurality of fastener tightening surfaces forms a fastener tightening angle between a first vector and each fastener tightening surface, said first vector extending radially from said central axis of said fastener through a center point of each fastener tightening surface, and a plurality of fastener loosening surfaces formed in the periphery of the fastener and spaced around said central axis of said fastener, and being equal in number to the number of fastener tightening surfaces, wherein each of said fastener loosening surfaces forms a fastener loosening angle between a second vector and each fastener loosening surface, said second vector extending radially from said central axis of said fastener through a center point of each fastener loosening surface, each one of said fastener loosening surfaces being transverse to one of said fastener tightening surfaces to form at least one fastener protuberance and an equal number of fastener recesses, wherein the fastener tightening angle is smaller than the fastener loosening angle; and a wrench provided for mating with and driving the fastener with a high torque in a tightening direction than in a loosening direction, said wrench having a central axis and comprising, a plurality of wrench tightening surfaces formed in a periphery of the wrench and spaced around said central axis of said wrench, wherein each of said wrench tightening surfaces forms a wrench tightening angle between a third vector and each wrench tightening surface, said third vector extending radially from said central axis of said wrench through a center point of each wrench tightening surface, and a plurality of wrench loosening surfaces formed in the periphery of the wrench and spaced around said central axis of said wrench and being equal in number to the number of wrench tightening surfaces, wherein each of said wrench loosening surfaces forms a loosening angle between a fourth vector and each wrench loosening surface, said fourth vector extending from said central axis of said wrench through a center point of each wrench loosening surface; each one of said wrench tightening surfaces being transverse to one of said wrench loosening surfaces to form at least one wrench protuberance and being transverse to another one of said wrench tightening surfaces to form at last one wrench recess, the number of wrench protuberances being equal to the number of wrench recesses, wherein the wrench tightening angle is smaller than the wrench loosening angle for each of the wrench loosening surfaces and wrench tightening surfaces;

wherein at least one of the plurality of wrench tightening surfaces formed is configured to mate with at least one of the plurality of fastener tightening surfaces in order to rotate the fastener to a tightened position, and at least one of the plurality of wrench loosening surfaces is configured to mate with at least one of the plurality of fastener loosening surfaces in order to rotate the fastener to a loosened position; and wherein each of said wrench and fastener protuberances include a joining surface that connects the respective loosening surface and corresponding transverse tightening surface.

* * * * *